April 24, 1956     J. MORRELL     2,743,116
STEERABLE PIVOT-WHEELED TRUCK TRAILER Filed Sept. 23, 1953     2 Sheets-Sheet 1

INVENTOR.
JAMES MORRELL
BY Joshua R. H. Potts
HIS ATTORNEY.

April 24, 1956     J. MORRELL     2,743,116
STEERABLE PIVOT-WHEELED TRUCK TRAILER
Filed Sept. 23, 1953     2 Sheets-Sheet 2
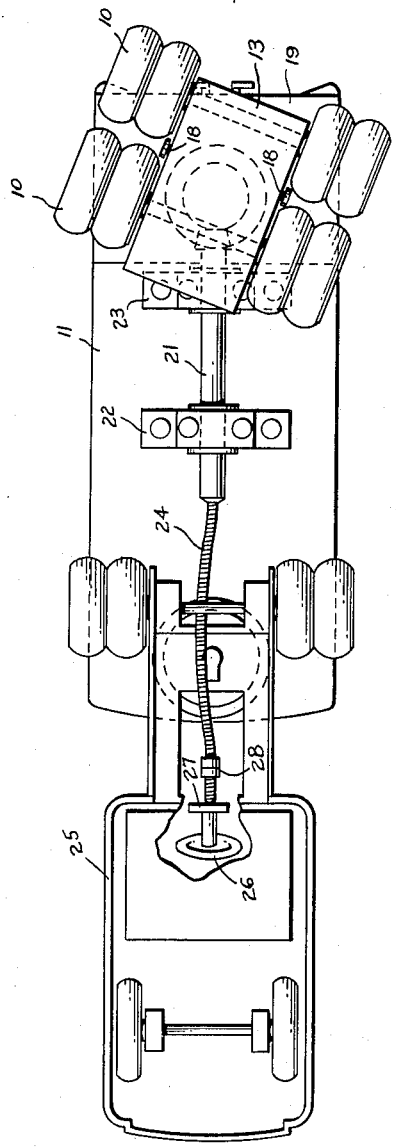
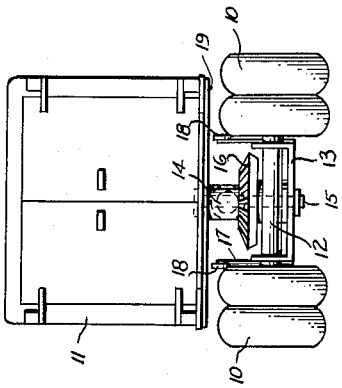
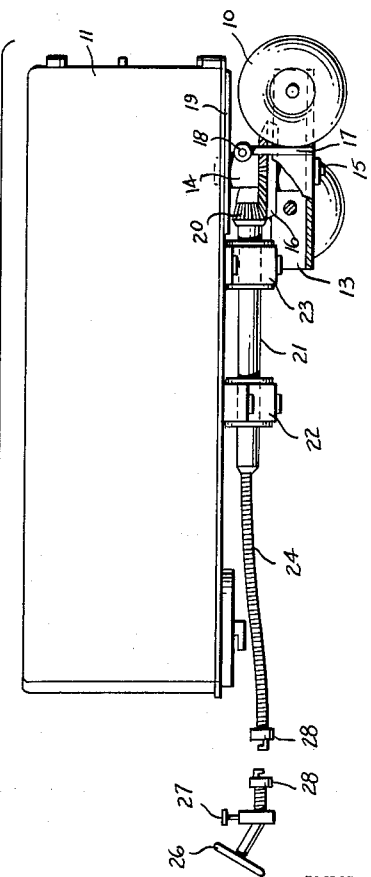
INVENTOR.
JAMES MORRELL
BY Joshua R H Potts
HIS ATTORNEY.

United States Patent Office 2,743,116
Patented Apr. 24, 1956

2,743,116

STEERABLE PIVOT-WHEELED TRUCK TRAILER

James Morrell, Philadelphia, Pa.

Application September 23, 1953, Serial No. 381,809

5 Claims. (Cl. 280—420)

This invention relates to truck trailers, and particularly to a truck trailer having pivoted or rotatable rear wheels to facilitate turning of the trailer in congested areas.

Today, with the great volume of interstate and intrastate commerce that is being accommodated by the trucking industry, the truck-trailer has become a keystone of the transportation industry. Yet, important as it is, its usefulness has been limited by a size restriction dictated by its difficult maneuverability in congested areas and narrow streets. In particular, difficulty is encountered in maneuvering a long trailer around a corner in a narrow street.

The conventional truck-trailer consists of a power-driven truck to which is detachably attached a trailer which houses the goods being transported. Ordinarily, the trailer is provided with rear wheels mounted on a fixed rear axle which is incapable of being independently turned, the front end of the trailer being pivotally connected to the truck. Thus, as the truck rounds a corner, the radius of turns of the rear end of the trailer is governed by turn radius initiated by the truck per se, since the trailer merely follows in the path thus established. This presents a problem in turning into a narrow street, for while the truck may round the corner with ease, the rear wheels of the trailer often contact the curbstone due to the length of the trailer and the fact that the rear wheel axle is fixed. As a result, the truck driver must jockey the truck back and forth until the trailer wheels have cleared the curbstone with the result that much valuable time is lost, not to mention the physical strain on the driver. As a result of this situation, the allowable length of trailers has been limited, and thus the payload per trailer has been similarly limited.

It is an object of this invention, therefore, to provide an improved truck trailer to facilitate turning in narrow streets and congested areas.

It is another object of this invention to provide an improved truck trailer having rear wheels mounted on an independently controlled and movable axle.

A further object of this invention is to provide a means for turning the rear wheels of a truck trailer from the truck cab.

Still another object of this invention is to provide a means for locking the trailer wheels so as to prevent accidental turning thereof in transit.

Another object of the invention is to provide a coupling means for detachably attaching the truck cab control means to the trailer wheel controls.

These objects, together with some of the advantages to be derived in utilizing the present invention, will become apparent from the following detailed description and from the accompanying drawings describing the preferred embodiment of this invention in which similar numerals refer to similar parts throughout the several views.

Figure 3 is a bottom plan view of the truck trailer of this invention showing the rotatable rear wheel truck in turned relation and flexible shaft means for controlling the turn thereof.

Figure 4 is a side elevational view of the trailer with parts broken away showing the gear means for turning the trailer rear wheel truck, and the flexible shaft means and related parts for controlling the turning thereof.

Figure 5 is a rear elevational view of the trailer of Figure 4.

Figure 1:
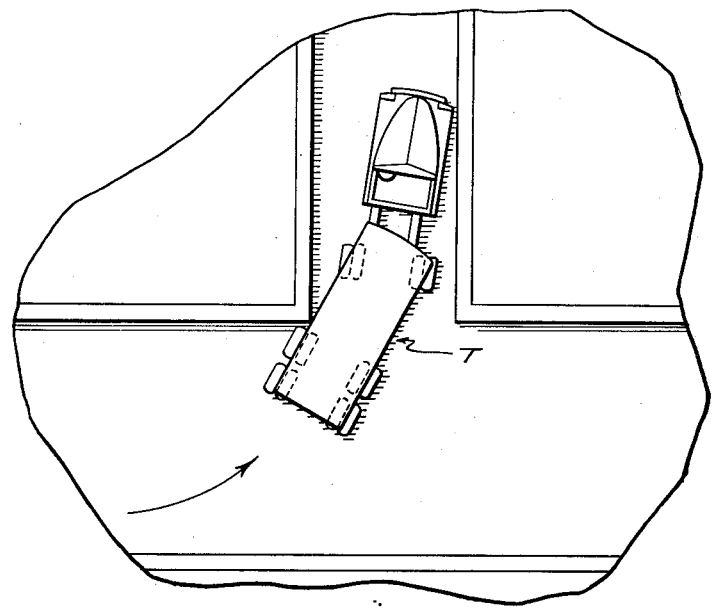
Figure 1 is a schematic plan view of the conventional truck trailer rounding a corner showing the typical interference of the rear wheels of the trailer with the curb.

Referring to Fig. 1 of the drawings, therein is shown a conventional truck trailer referred to in its entirety of the letter "T" as it rounds a corner in a narrow street. As illustrated therein, the rear wheels of the trailer interfere with the corner curbstone, making the turning of the trailer difficult and sometimes impossible. This is due to the fact that the rear wheels of the trailer are mounted on fixed axles.

Figure 2:
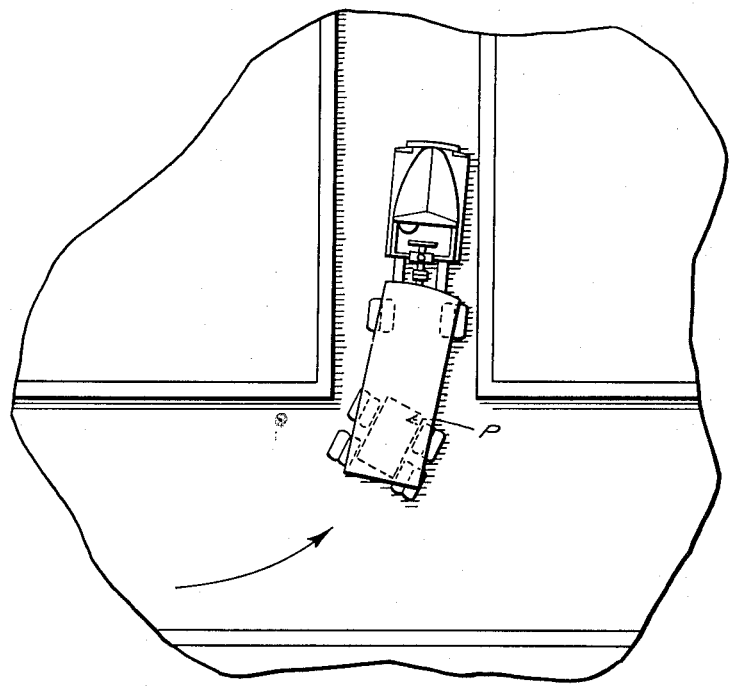
Figure 2 is a schematic plan view of the pivot-wheel truck trailer of the present invention illustrating how the rear wheels of the trailer are turned to overcome the common turning difficulties.

Referring now to Fig. 2, a truck trailer is there shown incorporating the pivot-wheel trailer truck of this invention, represented by the letter P, to facilitate turning of the trailer in narrow streets and congested areas. As shown therein, the rear wheels of the trailer are mounted on axles carried by a rotatable or pivoted truck P so that the said wheels can be turned independently of the front wheels so as to impart a shorter turn radius thereto, and thus round the corner without interference from the curbstone.

The details of this pivot-wheel truck on which the rear wheels are mounted and the means for controlling its movement are illustrated in Figs. 3 to 5. As shown therein, the rear wheels 10 of the trailer 11 are mounted on an axle 12 carried by a substantially U-shaped wheel truck frame 13. The said wheel truck frame 13 is carried by a rotatable post 14 which is pivotally connected to the trailer 11 by means of a pivot member 15. A horizontally disposed bevel gear 16 is attached to the post 14 for a purpose to be described below. Mounted on the wheel truck frame 13 are a pair of side sway support members 17 carrying a small rotatable wheel 18. The said side sway supports 17 may be made from tubular steel, or may be shock absorbers of the aircraft oleo strut variety. For trailers designed to carry heavy loads the latter sway support configuration is preferred. A side sway support wheel plate 19 is mounted on the underside of the trailer 11 directly above the wheel truck frame 13 to act as a bearing plate for any contact between the trailer 11 and side sway supports. Such contact is contemplated in the case of heavily loaded trailers as they round curves at high rates of speed.

Cooperating with the bevel gear 16 is a pinion 20 whose axis lies in a plane perpendicular to the axis of the said bevel gear 16. The said pinion 20 is carried by a horizontally disposed shaft 21 supported by bearings 22 and 23 which are fixedly attached to the underside of the trailer 11. Attached to the end of the pinion shaft 21 remote from said pinion is a flexible steel shaft 24 which terminates and is supported in the truck cab 25. The free end of the flexible shaft 24 carries a steering wheel 26 for controlling movement of said shaft, and a locking mechanism 27, preferably of the V-lock type, is associated with said steering wheel and flexible shaft for locking the steering wheel while the truck is in transit so as to prevent accidental turning of the pivot-wheel truck. In order to be able to detach the trailer from the driving truck, a suitable couple 28, such as a flexible cable knuckle coupling, is incorporated in the flexible shaft 24 immediately adjacent to the truck cab 25, so that the said shaft may be "broken" at that point to separate the truck from the trailer. As an alternative to the direct mechanical drive connection between the flexible shaft 24 and the pinion shaft 21, a hydraulic steering system may be incorporated in the pivot-wheel truck turning control mechanism.

*Operation*

While the operation of the pivot-wheel trailer truck described above should be apparent from the description presented, the operation thereof will now be discussed in detail. As the truck trailer rounds a corner in a narrow street, the driver or an assistant sitting beside him in the cab 25 may unlock the lock 27 to permit turning of the pivoted wheel truck frame 13. This is accomplished by turning the steering wheel 26 in the same manner as the conventional automotive steering wheel is turned. This turning motion is transmitted by means of the flexible shaft 24 to the pinion shaft 21, which in turn causes rotation of the pinion 20. Since the pinion 20 is in enmeshment with the bevel gear 16, the said bevel gear is also caused to rotate and being fixedly attached to the rotatable post 14 to which the wheel truck frame 13 is attached, causes the said frame to turn. The wheel axles 12 carrying the rear wheels 10 are also turned accordingly. Thus, by this means, it is possible to impart to the rear wheels of the trailer a shorter turn radius than that established by the front wheels of the truck, and thereby facilitate the turning of the trailer in narrow streets.

After the turn is made, the steering wheel 26 is again manipulated until the rear wheels 10 are in alignment with the front wheels of the truck, and the lock 27 is locked to prevent accidental turning of said rear wheels on the open highway.

When it is desired to detach the trailer 11 from the truck cab 25, the flexible shaft 24 is "broken" at the couple 28 provided for that purpose.

From the above description, it is seen that a novel means is provided for turning a long truck trailer in a narrow street and congested areas. As a result, valuable time ordinarily consumed in making such turns is saved, and possible damage to the trailer is avoided. It is foreseeable that as a result of this invention, larger trailers will be permitted to operate on the highways, thus increasing the payload per trailer per trip. And since damage to the trailer and its cargo will be avoided, it is even possible that insurance rates will be lowered in consequence thereof.

Although the present discussion has been limited to the above-described preferred embodiment, other variations thereof are possible without departing from the spirit of the invention. It is, therefore, not intended that the invention be limited to the particular embodiment disclosed, but only to the inventive concept as defined by the appended claims.

What is claimed is:

1. In a truck trailer including a power-driven truck having a driver's cab, a trailer detachably attached to said truck, a vertical post pivotally mounted on the aft end of said trailer, a wheel truck frame attached to said vertical post, rear wheels carried by said wheel truck frame, bevel gear means cooperating with said vertical post for causing pivotal movement thereof, a pinion in enmeshment with said bevel gear means, the said pinion being mounted on a horizontally disposed shaft, a flexible shaft drivably connected to said pinion shaft and extending into the driver's cab of said truck, and a steering wheel on the end of said flexible shaft in the driver's cab for controlling the turning thereof.

2. In a truck trailer including a power-driven truck having a driver's cab, a trailer detachably attached to said truck, a vertical post pivotally mounted on the aft end of said trailer, a wheel truck frame attached to said vertical post, rear wheels carried by said wheel truck frame, bevel gear means cooperating with said vertical post for causing pivotal movement thereof, a pinion in enmeshment with said bevel gear means, the said pinion being mounted on a horizontally disposed shaft, bearings supporting said pinion shaft on the underside of said trailer, a flexible shaft drivably connected to said pinion shaft and extending into the driver's cab of said truck, a steering wheel on the end of said flexible shaft in the driver's cab for controlling the turning thereof, and a locking mechanism associated with said steering wheel and flexible shaft.

3. In a truck trailer including a power-driven truck having a driver's cab, a trailer detachably attached to said truck, a vertical post pivotally mounted on the aft end of said trailer, a wheel truck frame attached to said vertical post, rear wheels carried by said wheel truck frame, bevel gear means cooperating with said vertical post for causing pivotal movement thereof, a pinion in enmeshment with said bevel gear means, the said pinion being mounted on a horizontally disposed shaft, a flexible shaft drivably connected to said pinion shaft and extending into the driver's cab of said truck, a steering wheel on the end of said flexible shaft in the driver's cab for controlling the turning thereof, a locking mechanism associated with said steering wheel and flexible shaft, and coupling means incorporated in said flexible shaft to permit the detachment of said truck from said trailer.

4. In a truck trailer including a power-driven truck having a driver's cab, a trailer detachably attached to said truck, a vertical post pivotally mounted on the aft end of said trailer, a wheel truck frame attached to said vertical post, rear wheels carried by said wheel truck frame, bevel gear means cooperating with said vertical post for causing pivotal movement thereof, a pinion in enmeshment with said bevel gear means, the said pinion being mounted on a horizontally disposed shaft, bearings supporting said pinion shaft on the underside of said trailer, a flexible shaft drivably connected to said pinion shaft and extending into the driver's cab of said truck, a steering wheel on the end of said flexible shaft in the driver's cab for controlling the turning thereof, and a V-lock associated with said steering wheel and flexible shaft and located within the driver's cab for locking the steering wheel while the truck is in transit.

5. In a truck trailer including a power-driven truck having a driver's cab, a trailer detachably attached to said truck, a vertical post pivotally mounted on the aft end of said trailer, a wheel truck frame attached to said vertical post, rear wheels carried by said wheel truck frame, bevel gear means cooperating with said vertical post for causing pivotal movement thereof, a pinion in enmeshment with said bevel gear means, the said pinion being mounted on a horizontally disposed shaft, a flexible shaft drivably connected to said pinion shaft and extending into the driver's cab of said truck, a steering wheel on the end of said flexible shaft in the driver's cab for controlling the turning thereof, a locking mechanism associated with said steering wheel and flexible shaft, and a flexible cable knuckle coupling in said flexible shaft immediately adjacent to the driver's cab to permit the detachment of said truck from said trailer.

References Cited in the file of this patent

UNITED STATES PATENTS

| Number | Name | Date |
| --- | --- | --- |
| 1,595,512 | Glogger | Aug. 10, 1926 |
| 1,890,576 | Fellows | Dec. 13, 1932 |
| 2,002,604 | Johnson | May 28, 1935 |
| 2,070,832 | Johnson | Feb. 16, 1937 |
| 2,167,943 | Fox | Aug. 1, 1939 |
| 2,646,850 | Brown | July 28, 1953 |